United States Patent [19]

Natarajan

[11] Patent Number: 4,887,218

[45] Date of Patent: Dec. 12, 1989

[54] AUTOMATED PRODUCTION RELEASE SYSTEM

[75] Inventor: Bharath Natarajan, Marietta, Ga.

[73] Assignee: International Business Machines Corporation, Armonk, N.Y.

[21] Appl. No.: 127,334

[22] Filed: Dec. 1, 1987

[51] Int. Cl.$^4$ .................. G06F 15/20; G06F 15/46
[52] U.S. Cl. .................................. 364/468; 364/403; 364/478; 364/551.01
[58] Field of Search ............... 364/468, 552, 551.01, 364/551.02, 200, 300, 900, 401, 403, 478

[56] References Cited

U.S. PATENT DOCUMENTS

| | | | |
|---|---|---|---|
| 3,946,212 | 3/1976 | Nakao et al. | 364/300 |
| 4,408,291 | 10/1983 | Gunzberg et al. | 364/900 |
| 4,459,663 | 7/1984 | Dye | 364/403 |
| 4,591,983 | 5/1986 | Bennett et al. | 364/403 |
| 4,644,480 | 2/1987 | Haruna et al. | 364/552 |
| 4,719,587 | 1/1988 | Berte | 364/552 |
| 4,796,194 | 1/1989 | Atherton | 364/468 |
| 4,807,108 | 2/1989 | Ben-Arieh et al. | 364/468 |

OTHER PUBLICATIONS

"An Evaluation of Order Release Mechanisms in a Job-Shop Environment," Ragatz et al., Decision Sciences, vol. 19, pp. 167-189, 1988.

*Primary Examiner*—John R. Lastova
*Attorney, Agent, or Firm*—Whitham & Marhoefer

[57] ABSTRACT

A conceptual decision analysis tool for production release planning displays management parameters and objectives and prompts the user to define priorities. This encourages the user to plan based on management criteria. The user keys in the priorities and the system automatically analyzes the impact of planned release on the manufacturing process using a simulation process and re-evaluates the order release priorities and sequence. This capability is used before any order is actually released to manufacturing. The system also provides the capability of analyzing the impact of the orders even after the user pre-sets priorities to release certain orders. The system calculates the revised sequence and produces impact statements on such management criteria as manufacturing throughput, work-in-process inventory and cycle time.

9 Claims, 6 Drawing Sheets

SPLIT SCREEN

| GIVEN LIST OF ORDERS | | | SELECT PRIORITY SEQUENCE | | |
|---|---|---|---|---|---|
| ORDER # | QUANTITY | DUE DATE | | | |
| X1 | Y1 | MM/DD/YY | _1_ | THROUGHPUT | |
| X2 | Y2 | MM/DD/YY | _3_ | WIP INVENTORY | |
| X3 | Y3 | MM/DD/YY | _2_ | CYCLE TIME | |
| X4 | Y4 | MM/DD/YY | ARE YOU SURE | Y | |
| X5 | Y5 | MM/DD/YY | | | |
| X6 | Y6 | MM/DD/YY | | | |
| X7 | Y7 | MM/DD/YY | RECOMMENDED PRIORITY AND RESULTS | | |
| | | | ORDER # | PRIORITY | OUTPUT |
| | | | $X_1$ | 7 | THROUGHPUT=$k_1$ |
| | | | $X_2$ | 2 | WIP INV.=$k_2$ |
| | | | $X_3$ | 4 | CYCLE TIME=$k_3$ |
| | | | $X_4$ | 5 | |
| | | | $X_5$ | 6 | |
| | | | $X_6$ | 1 | |
| | | | $X_7$ | 3 | |

NR: NUMBER OF RELEASES

FIG. 7

AUTOMATED PRODUCTION RELEASE SYSTEM

CROSS-REFERENCE TO RELATED APPLICATIONS

The subject matter of this invention is related to application Ser. No. 07/115,073 filed Oct. 28, 1987, by K. M. Ferriter and R. B. Mathis for "Automated Interface to Project Management Tool", which is assigned to a common assignee herewith. The disclosure of the Ferriter et al. application is incorporated herein by reference.

BACKGROUND OF THE INVENTION

1. Field of the Invention

The present invention generally relates to a computer based production release system and, more particularly, to a plant floor production release system which automatically interfaces a production release tool to a plant floor monitoring system to provide an integrated approach to a manufacturing software design. The system according to the invention is a conceptual tool that uses a top down release process which involves creating an order list of production orders to be released to the manufacturing floor for which all components have been allocated and are available for release. The invention provides an easy to use user friendly interface for the production planner on a split screen format to assist the production planner in releasing orders based on defined management criteria where the system automatically sets up select priorities for release based on the management criteria.

2. Description of the Prior Art

The process of designing, developing and manufacturing a set of new products, or making major changes to existing products, presents many challanges to product managers and manufacturing managers to bring a product to market for the least cost, within schedule while maintaining product quality. In today's highly competitive industries, product managers and manufacturing managers require information to address many problems that arise because of the complexity of new products and the complexity of world-wide production and the changing nature of competition. The requirement that products be manufactured in as short a period as possible while maintaining a low level of inventory on the shop floor to meet customer needs presents conflicting criteria to be analyzed in order to make timely decisions.

Many authors have published papers and books in the field of production management. For example, Joseph Orlicky wrote *Material Requirements Planning*, published by McGraw-Hill, which has become the industry standard reference for almost all job shop planning requirements. This concept of planning and releasing is well accepted and, even today, many vendors are selling software based on the concept. Nevertheless, this concept does not lend itself to releasing shop orders in the most efficient manner.

D. T. Phillips and G. L. Hogg published a paper entitled "A State-of-the-Art Survey of Dispatching Rules for Manufacturing Job Shop Operation", *International Journal of Production Research*, vol. 20, no. 1, (1982), pp. 27 to 45, which provides varying dispatching rules that can be used in a planning process. Though the areas of planning and scheduling have been discussed in detail, not a single product has been developed which provides an easy to use and user friendly method of automatically assigning priorities to orders prior to releasing them to the manufacturing floor based on management criteria of increased throughput, minimized work-in-process inventory and reduced cycle time while maintaining customer committments. What is needed is an expert system which is simple to use and user friendly that transforms the management criteria, i.e., increased throughput, reduced work-in-process inventory, and minimized cycle time, and provides the planner a mechanism that automatically assignes priorities to shop orders to be released prior to the actual release of orders to the manufacturing floor.

Expert systems are a branch of computer science, generally referred to as artificial intelligence, which exhibit characteristics normally associated with human behavior including learning, reasoning, solving problems, and so forth. More specifically, an expert system or "knowledge-based" system uses certain rules and a database to provide a user interactive environment in the form of a "consultation dialog", just as the user would interact with a human expert.

SUMMARY OF THE INVENTION

It is therefore an object of this invention to provide an easy to user system which implements a top down functional approach to an automated production release system.

It is another object of the invention to provide a system that prompts the production planner to alternate decision capabilities by a graphic display of expected results for varying alternatives.

The automated interface to project management tool described in application Ser. No. 07/115,073 employs a conceptual design tool to generate the manufacturing details by item in the product structure. When the user invokes the project management tool interface, the system prompts the user to select items of the product structure which are critical. The system then orders the selected items according to lead times from manufacturing detail gathered by the conceptual design tool. The ordered data is then formatted in a file of the project management tool. The formatted file is then imported into the project management tool. In addition, data modified in the project management tool can later be formatted for export to the conceptual design tool to allow the design process to continue with updated project data.

The subject invention builds on the foundation of the automated interface to project management tool, although the invention can be implemented and practiced independently. According to the present invention, the production planner, after receiving a list of shop orders that are ready to be released, based only on component availability from a Material Requirement Planning (MRP) system or similar project management tool, needs to specify only the priority of the three basic management criteria; namely, increased throughput, reduced work-in-process inventory, and reduced cycle time. The system automatically performs the remaining analysis and provides the planner with recommended priorities of orders to be released to the floor. The system is also flexible enough so that if the planner chooses a priority value for a given shop order, it will re-calculate the priority values of all other orders based on the selected criteria. The system will give a list of the results and the reasons for the recommendations.

The process begins with the traditional planning process where the production planner receives demand data of the manufactured parts from the customer set. All data is loaded into the planning system. A typical MRP system will explode the requirements of the end item into its sub-components and establish the order sequence based on earliest due dates. This invention takes over from then on. The system requirements for the invention include a simulation system for the manufacturing floor, although the specific simulation system and the language in which the simulation system is written is not critical to the practice of the invention.

BRIEF DESCRIPTION OF THE DRAWINGS

The invention will be better understood from the following detailed description of a preferred embodiment of the invention with reference to the drawings, in which.

DETAILED DESCRIPTION OF A PREFERRED EMBODIMENT OF THE INVENTION

Figure 1:
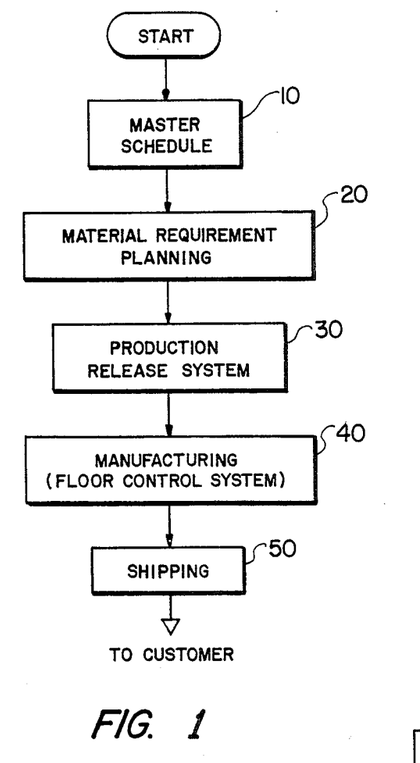
FIG. 1. is a system block diagram of the planning process showing the functional requirements for implementing the automated production release system according to the invention.

Referring now to the drawings, and more particularly to FIG. 1, there is shown in functional block diagram form the normal set of processes that take place in a typical manufacturing environment from the time of planning through production and shipment. The key parts of this system are the master schedule planning 10, where items are planned at the completed item level, the material requirement planning system 20, where requirements of completed items are exploded into sub-components and planned, and the production release system 30, where shop orders planned at the MRP level 20 are set for releasing to the manufacturing shop floor. The remaining two systems are the manufacturing floor control system 40 and the shipping systems 50.

Figure 2:
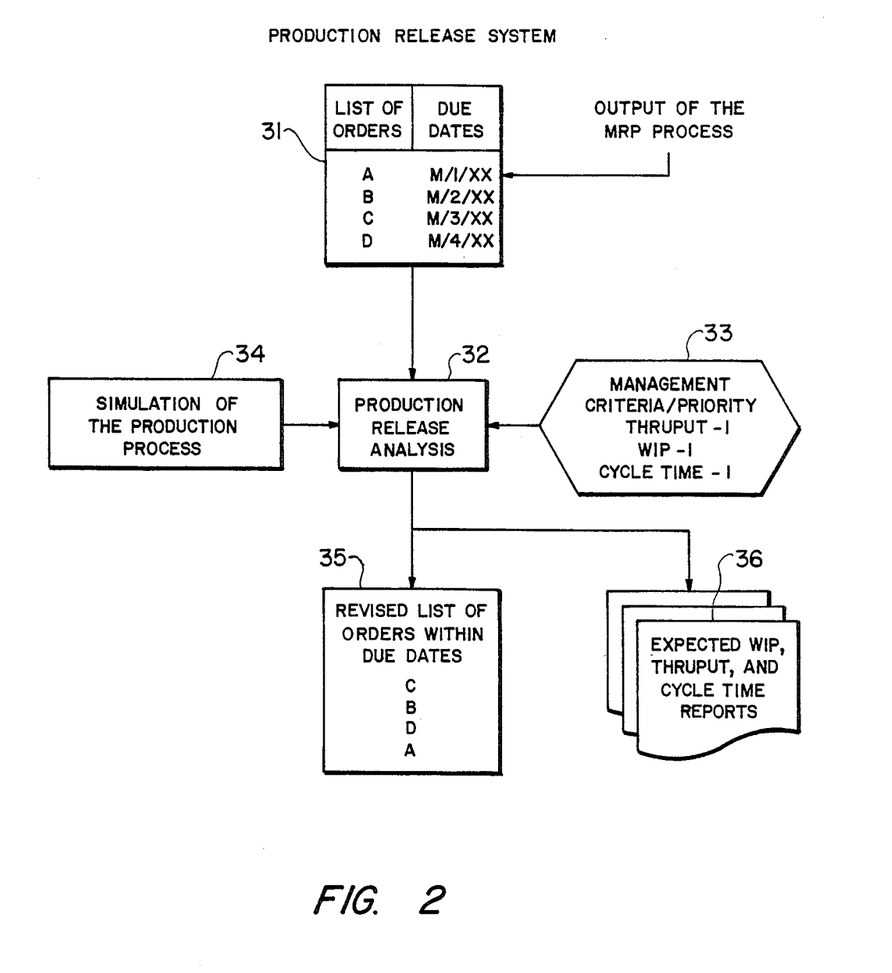
FIG. 2 is a block diagram showing a logical functional layout of a production release system which describes the input form the MRP planning process giving a list of orders with quantity and due dates.

FIG. 2 illustrates the production release system 30 in more detail. Here, the list of orders and their due dates as received from the planning system 20 are input to the production release system at function block 31 and reviewed for further analysis in function block 32. The production release system displays the management criteria priority as a default set or as input during a previous use and requests the user to input the current priorities. The user responds and provides this input at block 33. The system then invokes the common function simulation program of the shop manufacturing floor in block 34, calculates the various combinations of order release and dispatching rules as set out in List 1 below for the orders under evaluation and generates a recommended revised sequence and priorities in block 35 based on the results of the analysis. The system automatically sets up management reports in block 36 which can be printed upon request.

LIST 1

Order Release Rules (i) Critical Ratio is defined as a ratio which equals (due date —current date)/lead time remaining. If this ratio is less than 1.0, the job is critical and consequently will be a candidate for release.

(ii) I/O Balancing is a simple but effective method involving the following steps:
1. Establish unit of production to be measured.
2. Find appropriate level of in-process inventory.
3. Install means to measure output.
4. Release according to measured output.

(iii) Downstream Pull is a finite loading method that accounts for capacity and location. Steps for implementation are as follows:
1. Estimate capacities and flow times.
2. Establish means to measure in-process inventory by process.
3. Release according to calculated required and measured actual in-process inventory.

(iv) Bottleneck Scheduling is a reduced version of downstream pull and it involves the following steps:
1. Identify the bottleneck process.
2. Apply downstream pull concept over the identified process.
3. Insure that the process is saturated.

Dispatching Rules

Dispatching rules are used to establish the order in which orders are processed at a particular workstation.
(i) Shortest Imminent Operation Time (SI) dispatches those jobs that have a short processing time as opposed to long jobs. In order to have a limit on the maximum allowable time that a job can be waiting, this rule is often modified such that jobs with short processing times are released provided no other job in the queue is made to wait more than a given specified amount of time. The revised rule is often described as SI/T (truncated) rule.
(ii) Earliest Due Date dispatches jobs that have the earliest due dates.
(iii) First-In-First-Out (FIFO) releases jobs based on the order they arrive for processing.
(iv) Critical Ratio dispatches jobs based on ratio as described above. This ratio is also used as a dispatching rule.

Figure 3:
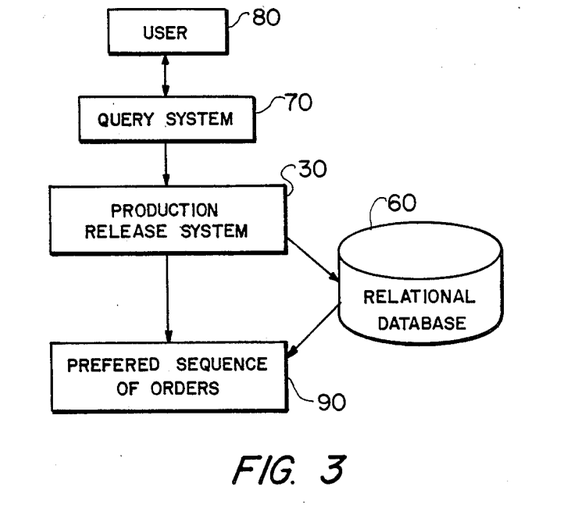
FIG. 3 is a block diagram illustrating the relative position of the user with respect to the production release system and a relational database.

FIG. 3 illustrates the key parts of the system from the user point of view. The key parts are the database 60 and the query system 70. The database can be any of several products currently available, but for purposes of this preferred embodiment, IBM's DataBase 2 (DB2) is used. DB2 is a relational database management system, ,but it will be understood by those skilled in the art that other databases, including hierarchical databases, could be used. General information on IBM's DB2 can be had with reference to publication GC26-4073-2 published by IBM Corp. The query system can be an expert system, but for purposes of the preferred embodiment, IBM's Restructured Extended Executor (REXX) language is used. A description of the REXX language is provided in "Virtual Machine/Systems Product, System Product Interpreter User's Guide", Release 4, publication SC24-5238-2 published by IBM Corp.

The user 80 can query the current status, completion date and the priority sequence of any job in question using the query system 70. The query system 70 interfaces with the production release system 30 which accesses data in database 60 and provides a preferred sequence of orders 90.

The data base as defined has the capability to capture the decision variables tested and the results obtained for each test. The user can access the results using the query facility at a later date, if needed. This enhances the analysis capability of future test data. This also provides an additional enhancement to the system.

Figure 4:
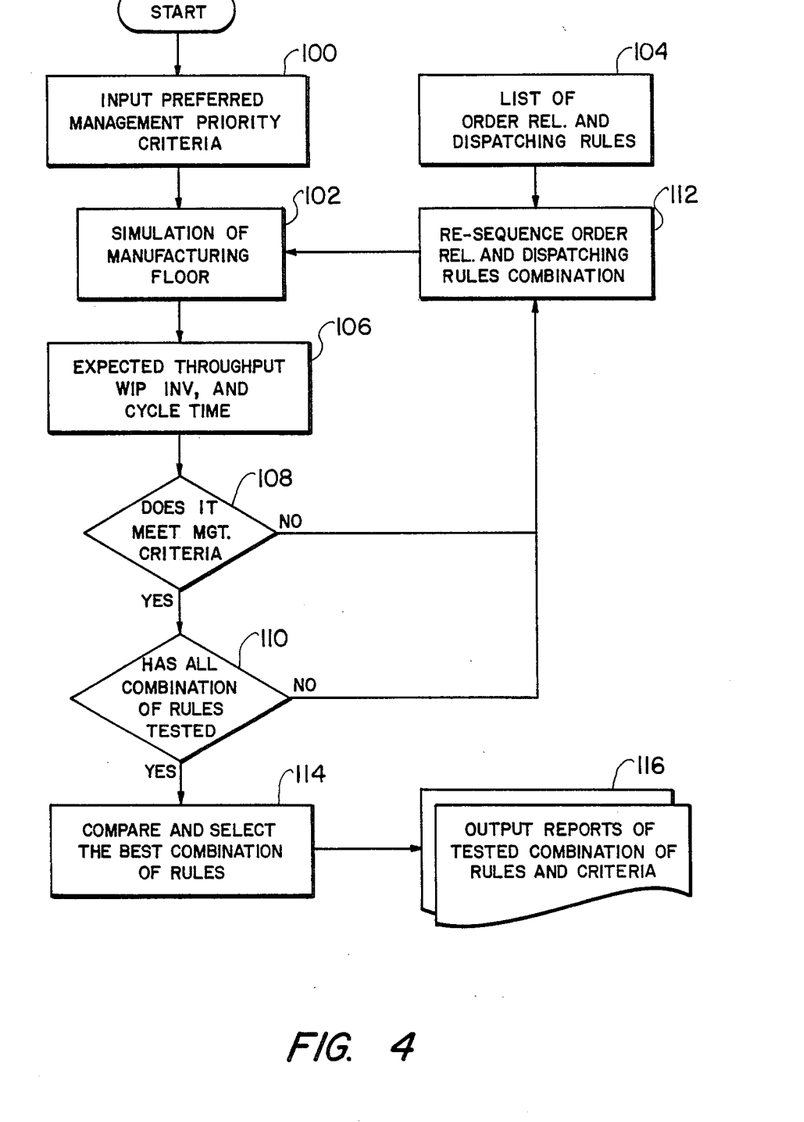
FIG. 4 is a flow chart illustrating the logical analysis flow for arriving at the best combination of order release and dispatching rules under a given management criteria of throughput, work-in-process inventory and cycle time.

The flow chart of FIG. 4 illustrates in detail the functional logic of the release analysis system. The process begins in function block 100 where the user input preferred management priority criteria is received by the system. Then the simulation of the manufacturing floor is invoked in function block 102. The simulation in turn has an additional input derived from the list of order relationships and dispatching rules, i.e., List 1, as indicated in block 104. The result of the simulation in block 106 is the expected throughput, work-in-process inventory and cycle time. A test is made in decision block 108 to determine if the result of the simulation meets management criteria. If it does, a further test is made in decision block 110 to determine if all combinations of the rules have been tested. If either of the tests in decision blocks 108 or 110 is negative, control goes to function block 112 which receives as its input List 1 from block 104. In function block 112 a new sequence of order relationships and combination of dispatching rules is generated to control the simulation of the manufacturing floor in function block 102. When both tests in decision blocks 108 and 110 are positive, the best result of the various combination of rules is selected in function block 114 and reports of the tested combination of rules and criteria is output in function block 116.

It is appropriate at this stage to discuss the simulation of the manufacturing floor as described in block 102. Those skilled in the art of simulation will understand that a simulation of a manufacturing system can be accomplished in a number of ways. It can be custom programmed in any language or it can be a customized enhancement to a commercially available computer program. One such program is "GEMS II", a Generalized Manufacturing Simulator published by Loadestone-II, Inc. of Bryan, Tex. This software package has the natural orientation to modeling manufacturing environments. GEMS II is a network based technique such that its model is largely represented in a graphical format which resembles both manufacturing process flow diagrams and a PERT (Program Evaluation and Review Technique) chart. The model consists of boxes or nodes which, in general, represent various manufacturing and decision activities of the system, and arcs which show the procedural relationships among the activities. The logic of GEMS II recognizes queues (in-process inventories, production backlogs, etc.) and assembly processes. Further, it recognizes competition among activities for limited resources, such as tools, fixtures, space and manpower.

Figure 5:
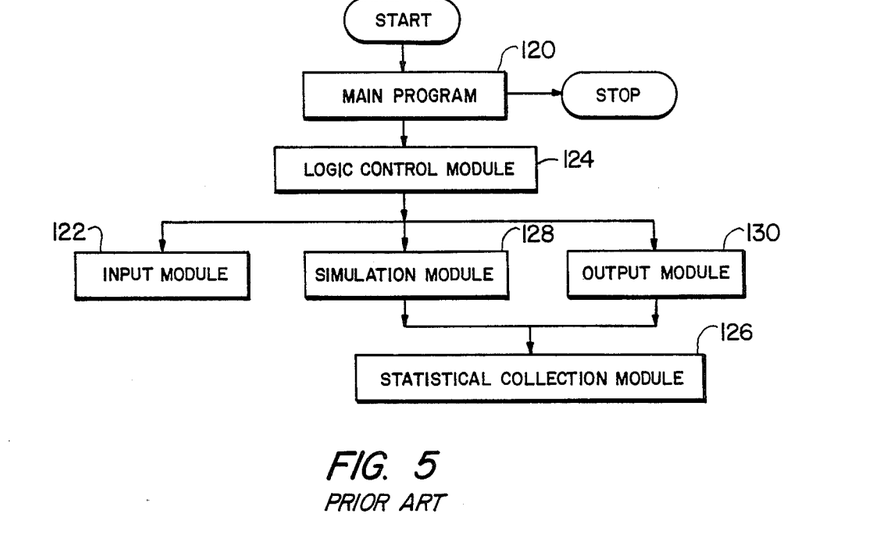
FIG. 5 is a system funcational flow diagram of a conventional simulation program which may be used in the practice of the invention.

The functional flow diagram of the GEMS II simulator program is shown in FIG. 5. The simulator consists of a main program 120 and a plurality of subroutines. Its design incorporates the interaction of five components; data input via the input module 122, logic control via the logic control module 124, statistical data collection via the statistical collection module 126, simulation via the simulation module 128, and output via the output module 130. The main program 122 initiates the program, initializes variables, and transfers control of the program to the several operational modules.

The logic control module 124 is the executive routine which organizes the execution sequence of the other four modules. The data input module 122 reads the input data and constructs the simulation data base. The simulation module 128 provides the support for systems including simulation, generation of random numbers and deviates for each simulation run. The statistical data collection module 126 collects and maintains relevant statistics. The output module 130 writes the report of the simulation.

Figure 6A:
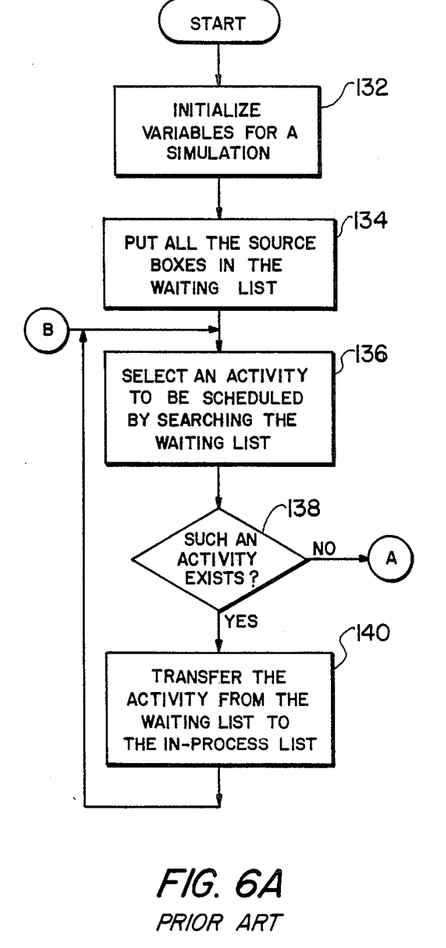
FIGS. 6A and 6B, taken together, are the simulation logic flow chart of the simulation program illustrated in FIG. 5.
Figure 6B:
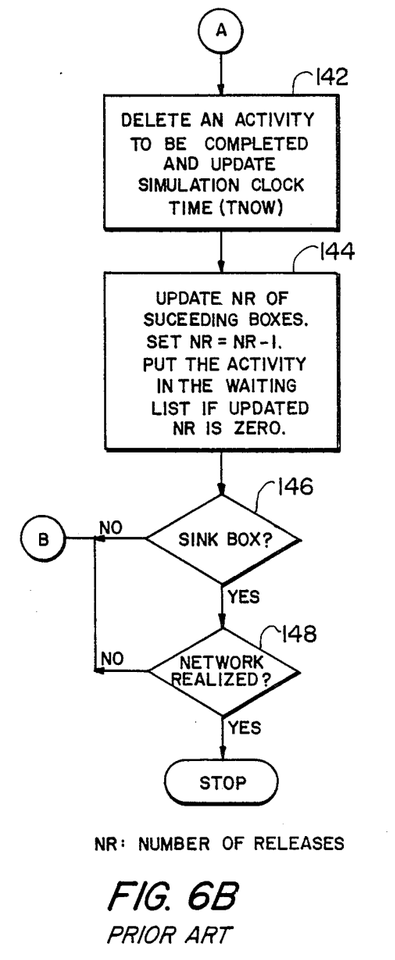

FIGS. 6A and 6B, taken together, are a simplified flow chart of the basic logic of the GEMS II simulation. The process begins in function block 132 where variables are initialized for simulation. All the GEMS II source boxes are then put in the waiting list in function block 134. The transactions in the waiting list are scanned in function block 136 to select an activity to be scheduled. The activity selected is the one which is feasible to schedule and has the highest priority level. A test is made in decision block 138 to determine if the selected activity exists, and if it does, it is transferred from the waiting list to the in-process list in function block 140. When a transaction is enetered into the waiting list, it is associated with a particular list location. Associated with each location is a box number, a pointer to the next transaction in the list, and a series of attributes. When the transaction is transferred from the waiting list to the in-process list, all that actually occurs is that the pointers in both lists are updated. The procedure is repeated until no feasible transaction are found in the waiting list. At this time, the test in decision block, at which time control goes to connector A in FIG. 6B.

With reference now to FIG. 6B, the activity whose completion time is the smallest is selected from the in-process list. The activity (transaction) is then deleted from the in-process list and TNOW is set to the completion time of the activity, as indicated in function block 142. The number releases (NR) of the follower boxes of the activity are updated in function block 144. If NR reaches zero, the follower box activity is entered into the waiting list. A single simulation run is completed when the specified number of sink box completions have occurred or the requested simulation completion time has been reached, as determined by the tests in decision blocks 146 and 148. An exception to this occurs when segmentable boxes are used in the system model. Segmentable boxes are those for which an activity can be stopped temporarily for a specified period of time, in which case the in-process list is scanned to determine if segmentable activities are in process. If some segmentable activities are in process, the waiting list is scanned a second time to determine if any of the activities in the waiting list have a higher priority level than the segmentable boxes' priority levels. If not, the process proceeds as before; otherwise, all segmentable boxes with priority levels less than the waiting activities priority level are preempted and transferred to the waiting list from the in-process list.

The list of orders to be tested for simulation is treated as an event; that is, one order will be treated as an event with the average processing times, i.e., time required to move from station A to station B, etc., extracted from the parameter data base which contains each process related data for the item under study. In FIG. 4, function block 112 causes the re-sequencing of order release and dispatching rules. After a simulation is conducted with using one order release rule and a dispatch rule, a simulation is next conducted using the next rule which has not been tested. In other words, block 112 acts as a rule changing block which becomes the next test case for simulation analysis. The logical flow describes the procedure to test all possible combinations of order release and dispatching rules before the test is completed and results analyzed.

Figure 7:
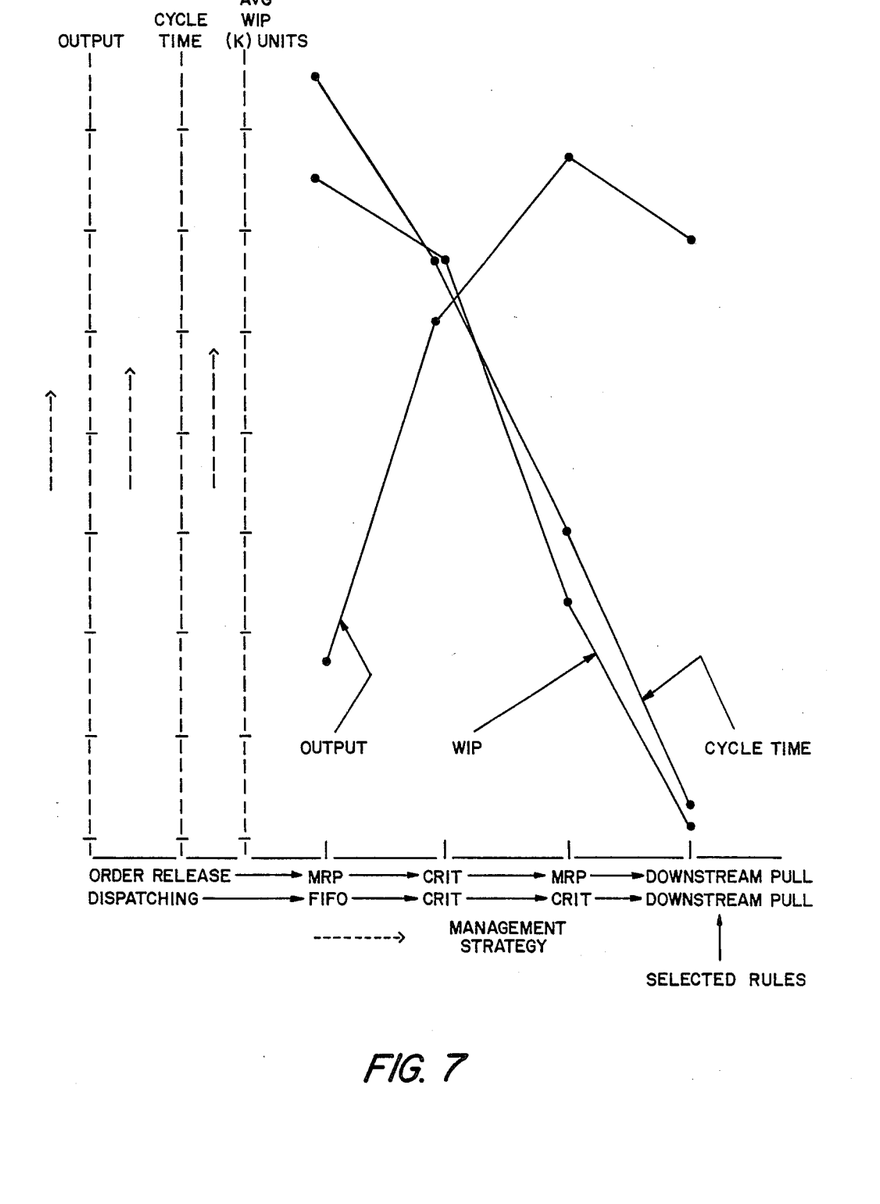
FIG. 7 is a sample graph of one set of test results and the associated selection results.

FIG. 7 is a graph showing a sample result. As can be seen in this figure, the downstream pull rule of order release and dispatching provides the least amount of work-in-process inventory and cycle time. However, the output value is less than that of the value with the order release rule as MRP and critical ratio as the dispatching rules. If the preferred management criteria priority is set to work-in-process inventory reduction as highest priority followed by cycle time reduction and throughput, the selected order release and dispatching rules would be downstream pull. If output required the highest priority, the selected rule would be MRP followed by critical ratio as order release and dispatching rules, respectively. Based on the system selected rules, the system automatically sets priorities for the shop orders in question for release.

Figure 8:
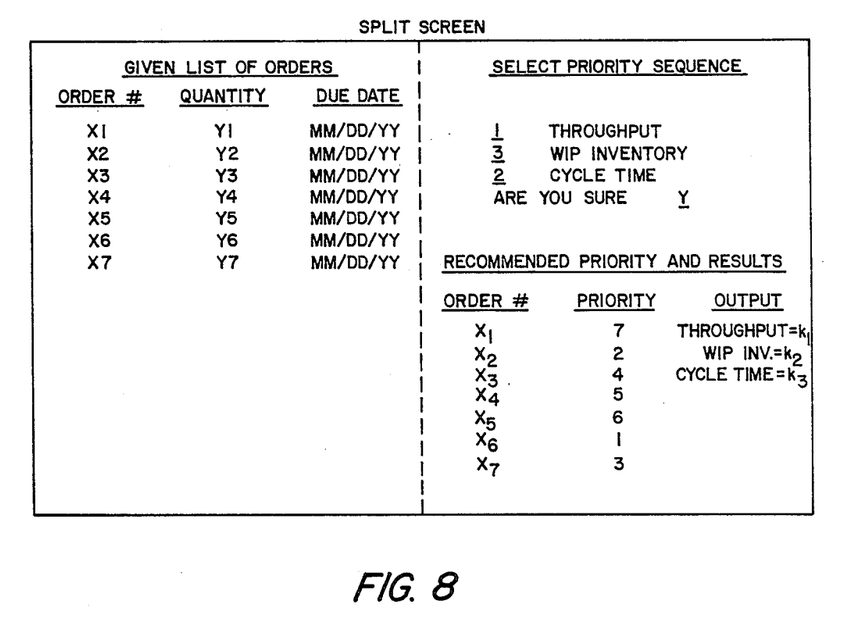
FIG. 8 is a sample display screen layout.

FIG. 8 illustrates the split screen format adopted for orders planned and recommended priority for release. The split screen display of the manufacturing manager's management criteria alongside the effects due to the priority input is a valuable tool for the planner/user. This is very practical for the user as he or she can immediately see the effect of a priority sequence. As mentioned, the system will also be able to define priority sequence of orders among the list after a specific order or sets of orders are pre-defined. The user can make modifications to management priority and see what it does to the priority sequence of the remaining orders. This split screen concept is very user friendly and provides improved decision making capabilities to the user. This analysis thus provides an element of artificial intelligence to the system.

To further illustrate the artificial intelligence provided by the system, reference is again made to FIG. 4. The user as defined earlier is prompted through the split screen format to list the management priority for throughput, work-in-process reduction and cycle time for the manufacturing process. As is common in any manufacturing process, the manager would always prefer to maximize the throughput, minimize the work-in-process inventory and reduce the manufacturing cycle time. Unfortunately, in the real world, these criteria are not complementary requiring the manager to accept compromises in his decision making. In general, if it is desired to maximize the output, all machines in the manufacturing process need to be functioning all the time, which means that there should be enough material ready for the process. However, this tends to increase the work-in-process inventory. On the other hand, if a small order is waiting behind a large order, even if all the machines are working to their full capacity, if not properly scheduled certain orders may be waiting for more than a desired time thereby increasing the manufacturing cycle time.

In block 100, the input requirement from management regarding the priority settings is specified. This is followed in block 102 by the simulation function of the manufacturing shop floor. This capability to be able to simulate any environment is assumed as a requirement of the system according to the invention. Using the list of orders to be released and the list of order release and dispatch rules (List 1), the system calculates varying different possible results. After a thorough search of the results, the order sequence that provides the desired throughput, work-in-process inventory and cycle time for a selected set of order release and dispatching rules is selected. This capability for selecting the desired order release sequence for a given management objective is the artificial intelligence that the system according to the invention provides.

The invention has been described using one commercially available simulation program. Other simulation programs, such as IBM Corp.'s GPSS generalized simulation program, could be used. What the invention does is to provide the manufacturing manager with a powerful planning tool by using the simulation program to test various management priorities and display the results in a split screen format which greatly enhances the manager's decision capabilities. Thus, while the invention has been described in terms of a single preferred embodiment, those skilled in the art will recognize that the application can be practiced with modification within the spirit and scope of the appended claims.

Having thus described my invention, what I claim as new and desire to secure by Letters Patent is as follows:

1. An automated production release system for implementation on a computer, said system providing for the production release planning information for a manufacturing environment to aid a user to make decisions that will improve the production release process, comprising the steps of:
   prompting the user to define management priorities between maximizing throughput, minimizing work-in-process inventory and minimizing manufacturing cycle time;
   simulating the manufacturing environment using a predefined set of order release and dispatching rules to test for varying alternatives in the production release process;
   selecting the result of the various alternatives which optimize the management priorities input by the user; and
   generating a revised sequence of production release orders for the manufacturing environment.

2. The automated production release system as recited in claim 1 wherein said computer includes a database and a query system and further comprising the steps of:
   capturing in the database decision variables generated in said step of simulating;
   responding to a user input via the query system to access the decision variables captured in the database; and
   displaying an analysis of tested combinations of the tested alternatives in the production release.

3. The automated production release system as recited in claim 2 further comprising the step of responding to a user input via the query system to select a decision rule and evaluate the tested alternatives based on the management criteria of throughput, work-in-process inventory and cycle time.

4. The automated production release system as recited in claim 1 further comprising the step of displaying in a split screen format a list of orders for processing in the manufacturing environment and said revised sequence of production release orders with an assigned priority for each order.

5. The automated production release system as recited in claim 4 further comprising the step of displaying management priorities defined by the user correlated with said revised sequence of production orders.

6. The automated production release system as recited in claim 1 further comprising the steps of:
providing an option to the user of changing said predefined set of order release and dispatching rules to make a new set of order release and dispatching rules; and
performing said simulating step according to said new set of order release and dispatching rules.

7. The automated production release system as recited in claim 6 wherein said computer includes a database and a query system and further comprising the steps of:
capturing in the database decision variables generated in said step of simulating;
responding to a user input via the query system to access the decision variables captured in the database; and
displaying an analysis of tested combinations of the tested alternatives in the production release.

8. The automated production release system as recited in claim 7 further comprising the step of displaying in a split screen format a list of orders for processing in the manufacturing environment and said revised sequence of production release orders with an assigned priority for each order.

9. The automated production release system as recited in claim 8 further comprising the step of displaying management priorities defined by the user correlated with said revised sequence of production orders.

* * * * *